United States Patent [19]

Nikolich

[11] 4,121,339

[45] Oct. 24, 1978

[54] SAFETY BRAKE MECHANISM FOR CHAIN SAWS

[76] Inventor: Milovan Nikolich, 4040 N. Central Pk., Chicago, Ill. 60618

[21] Appl. No.: 823,339

[22] Filed: Aug. 10, 1977

[51] Int. Cl.[2] ........................ B23D 57/02; B27B 17/00

[52] U.S. Cl. ........................................ 30/381; 30/383; 188/77 R

[58] Field of Search ......................... 30/381, 383, 382; 192/129 R, 130; 188/77 R, 166

[56] References Cited

U.S. PATENT DOCUMENTS

| | | | |
|---|---|---|---|
| 3,776,331 | 12/1973 | Gustafsson | 30/381 |
| 3,934,345 | 1/1976 | Hirschkoff | 30/383 |

*Primary Examiner*—Al Lawrence Smith
*Assistant Examiner*—Roscoe V. Parker

[57] ABSTRACT

A guard member is mounted on the chain saw for swinging movement between an actuate position and a reset position. The guard member occupies a normal position between the actuate and reset positions. A brake band is integral with a bowed column spring which applies the braking force to arrest movement of the cutting chain. A latching mechanism includes an arm with a latch pin engaged by a yieldable latch finger; this latch finger is integral with the bowed column spring. The guard member deflects the latch finger in response to movement of the guard to its actuate position; this action allows the column spring to apply the brake. The guard member is moved to its actuate position in response to a sudden movement of the chain saw, as in the case of "kickback"; this movement of the guard member is brought about by inertia or the engagement of the guard with the operator's body (most likely the wrist or the back of his hand) during this abrupt movement of the chain saw. Manual swinging of the guard to its reset position deactivates the brake and re-establishes the latch.

12 Claims, 6 Drawing Figures

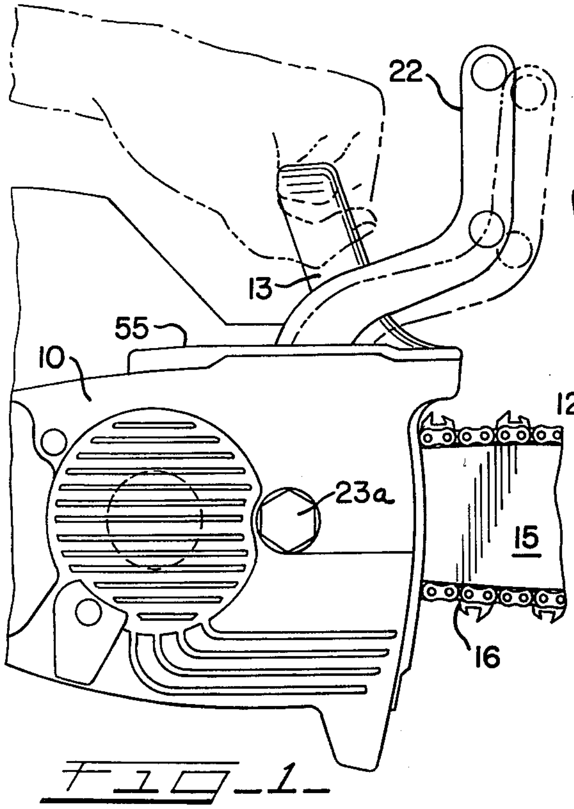
FIG. 1
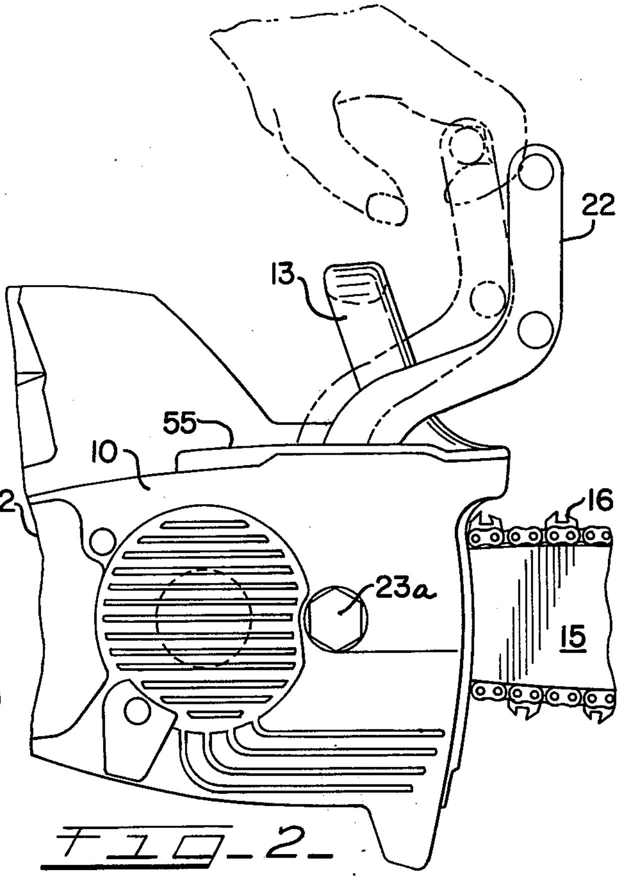
FIG. 2
FIG. 3
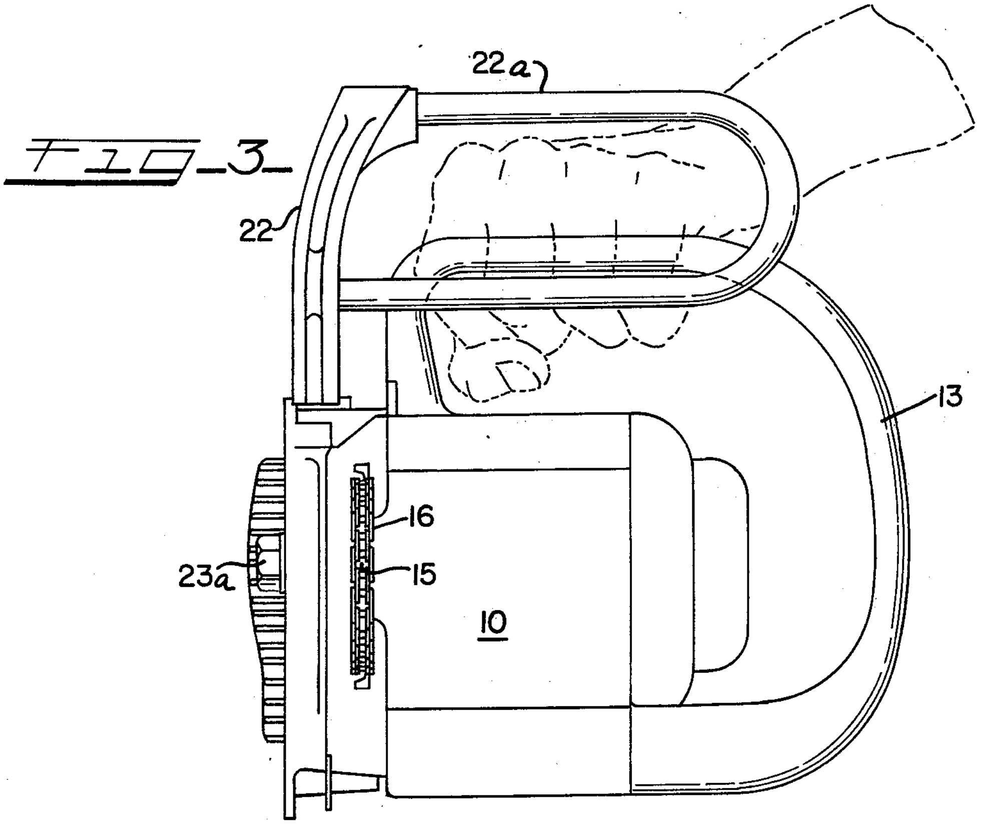

SAFETY BRAKE MECHANISM FOR CHAIN SAWS

BACKGROUND OF THE INVENTION

1. Field of the Invention

The present invention relates to hand-held powered chain saws. More particularly, the present invention relates to a safety brake mechanism for such chain saws.

Portable chain saws of the type here under consideration are utilized by an operator grasping the apparatus with both hands. These chain saws are provided with what may be termed a control handle extending generally rearwardly of the saw housing. Another handle, which may be called a frame handle, is usually disposed transversely of the saw adjacent the forward portion thereof. A throttle for the gasoline engine of the saw is mounted adjacent one of these handles.

During a cutting operation, the cutting chain may often engage a green limb, for example, at the tip of the guide bar thereby causing an abrupt movement of the chain saw. This condition is commonly referred to as "kickback." This abrupt action of the chain saw may cause the moving cutting chain to come into contact with the head, face or other parts of the operator's body thereby resulting in serious injury or even death.

2. The Prior Art

The prior art includes various safety devices for preventing, or at least minimizing the possibility of, injury to the operator by a chain saw as a result of kickback or other operations wherein the moving cutting chain could be brought into contact with the operator's body. Generally, these devices include guard members moveably mounted adjacent the frame handle. Should the chain saw rotate rapidly as a result of "kickback," the guard member will usually come into contact with the operator's wrist or the back of his hand thereby actuating a brake to arrest movement of the cutting chain. These guard members may be provided with sufficient mass such that the brake will also be activated by inertia in response to a sudden movement of the saw, such as in the case of kickback. Representative prior art U.S. patents showing such devices include: Mattson et al., No. 3,664,390; Moore, No. 3,739,475; Gustafsson, No. 3,776,331; Moore, No. 3,793,727; and Dooley, No. 3,839,795.

These prior art devices, although generally satisfactory, suffer from two principal deficiencies. First, the safety brake mechanisms shown in these patents are rather complicated thereby contributing significantly to the weight of the chain saw. Needless to say, it is important that hand-held chain saws of the type here under consideration be as light as possible to facilitate their ready handling, particularly in the case of tree trimming. The second deficiency of these prior art devices is the somewhat high cost of these brake structures resulting from their complicated nature.

SUMMARY AND OBJECTS OF THE PRESENT INVENTION

The present invention is principally characterized by a safety brake mechanism for a hand-held chain saw, wherein said brake mechanism is of simple construction and constituted by a very minimum number of parts.

A primary object of the present invention is the provision of a brake mechanism of this type which is controlled by a guard member, the latter being actuated either by inertia or by engagement with the operator's body, e.g., wrist or back of hand.

Another object of the present invention is the provision of a new and improved safety mechanism for hand-held power saws wherein a single member provides plural functions of the brake.

Still another object of the present invention is the provision of a safety brake of the type described wherein a single member provides the braking force for the brake and also serves to control a yieldable latching member associated with the brake.

Yet another object of the present invention is the provision of a safety brake of the type described wherein a unitary member constitutes one of the friction brake elements, provides the spring force for the brake and also serves to control the latching mechanism for the brake.

These and other objects and advantages of the present invention will become apparent from the following specification disclosing a preferred embodiment shown in the accompanying drawings.

DESCRIPTION OF THE DRAWINGS

FIG. 1 is a fragmentary side elevational view of a chain saw embodying the present invention, showing the guard member in solid lines in its normal position and in phantom lines in its actuate position;

FIG. 2 is a side elevational view of a chain saw embodying the present invention wherein the guard member is shown in phantom lines in its reset position;

FIG. 3 is a front elevational view of the chain saw;

DESCRIPTION OF THE PREFERRED EMBODIMENT

Figure 4:
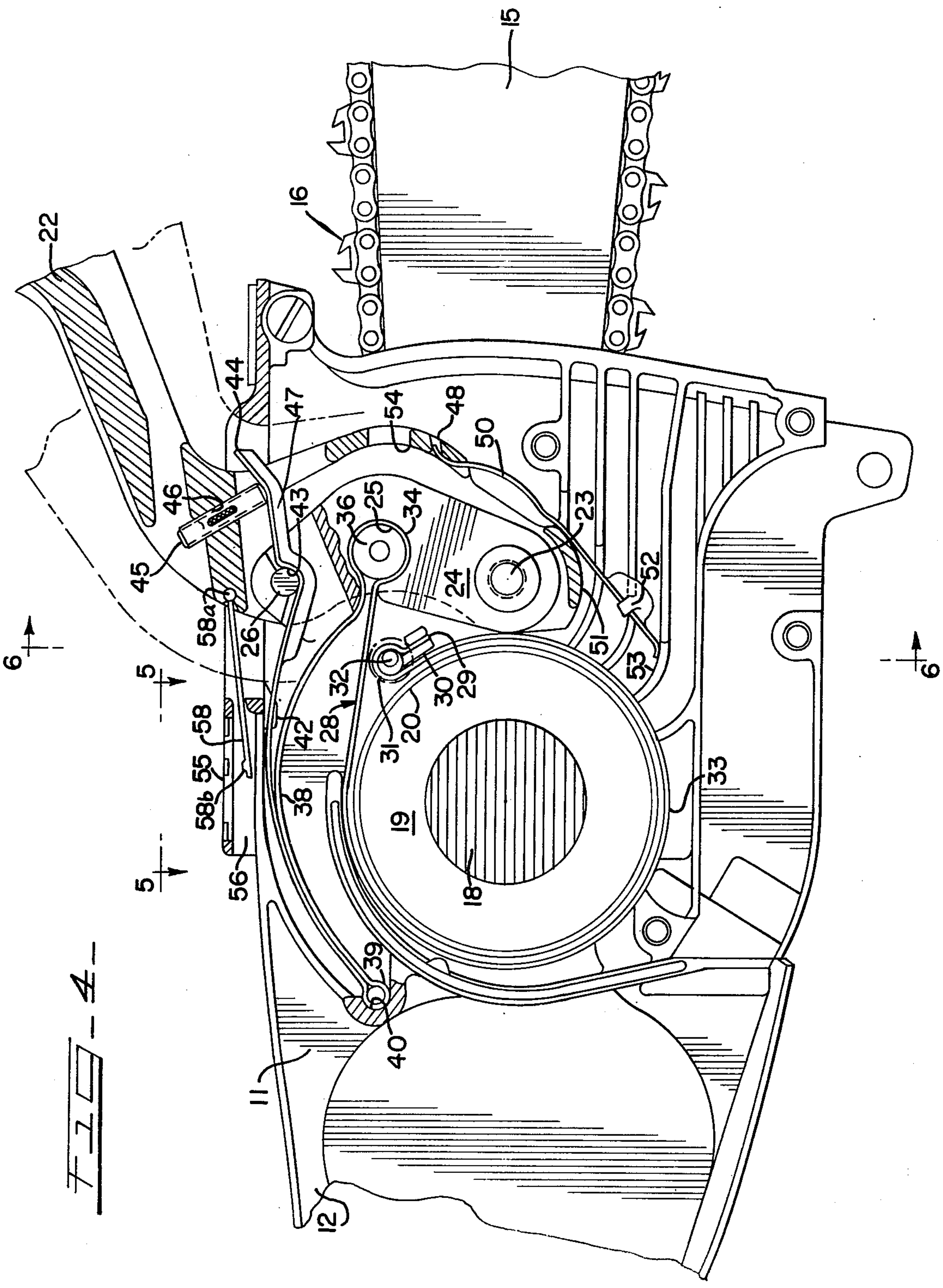
FIG. 4 is an enlarged, vertical, longitudinal section taken through the chain saw.

A hand-held chain saw includes a housing 10 having a frame member 11. This frame supports a so-called control handle 12 (fragmentarily shown in FIG. 4) which may be of the spade-handle type. The frame of the chain saw also supports a transversely disposed frame handle 13.

The frame of the chain saw mounts the usual guide bar 15 which supports a cutting chain 16. It will be understood that a suitable internal combustion engine or electric motor is contained within the housing 10 for driving the cutting chain through a clutch of known construction.

The drive sprocket (not shown) for the cutting chain 16 is mounted on a shaft 18. This shaft mounts a brake drum 19, the latter preferably including an annular brake band 20.

Figure 6:
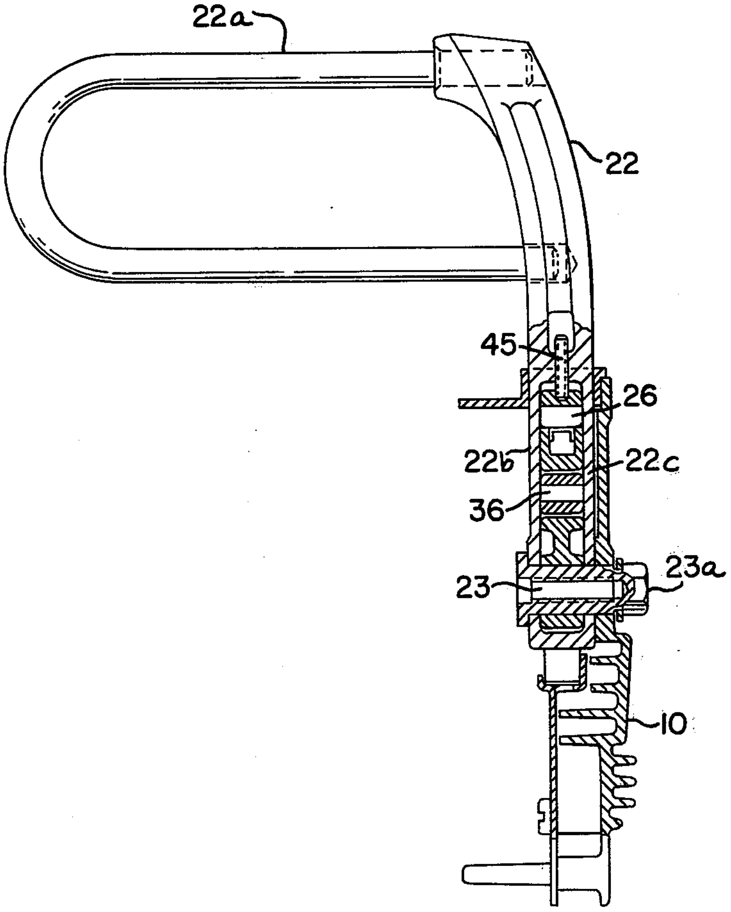
FIG. 6 is a partial section taken along the line 6—6 of FIG. 5.

A guard member 22 is mounted from the frame 11 of the chain saw for swinging movement about a pivot pin 23, the latter being journaled in the housing and secured in place by a fastener **23*a*. As shown in FIGS. 3 and 6, the guard member mounts a guard bar 22*a* disposed just forwardly of the frame handle 13. As will become clear, the guard 22 is mounted for swinging movement between an actuate or stop position, shown in phantom lines in FIG. 1, and a reset position, shown in phantom lines in FIG. 2. When the safety brake of the present invention is in a ready or run condition, the guard 22 occupies a normal position shown in solid lines in FIGS. 1 and 2**.

The guard 22, which is preferably a cast member, has spaced wall portions 22*b*, 22*c* thereby defining a space for receiving a latch arm 24, the latter also being pivotally mounted by the pin 23. This latch arm is provided with a generally circular cut-out 25 intermediate the ends thereof. The arm 24 mounts a latch pin 26 at the distal end thereof.

A single, unitary member, generally designated 28 and now to be described, performs a number of important functions. This member is in the form of a metal band having one end 29 received between a pair of lug formations 30 mounted on the frame of the chain saw. The band 28 includes a portion 31 which is bent around a stud 32, the latter being integral with the frame of the chain saw. Thus, one end of the member 28 is securely anchored to the frame of the chain saw by the construction just described.

The member 28 has a portion 33 thereof extending around the annular brake band 20; this portion 33 of the band acts as a brake band to establish the braking action when it is brought into frictional engagement with the annular brake band 20.

The portion 33 of the band member joins with a generally circular portion 34 received within the cut-out 25 of the latch arm 24. The band portion 34 is retained within this cut-out by means of an annular plug 36.

The circular portion 34 of the member 28 joins with another portion 38 which is bowed to form a so-called column spring. The spring portion 38 joins with a generally circular portion 39, the latter being received within a recess 40 formed in the frame of the power tool.

The circular portion 39 of the member 28 joins with a yieldable portion 42 which is bent, as at 43, to constitute a latch formation. As noted in FIG. 4, this portion 43 is configured so as to receive the latch pin 26.

The band member 28 terminates in a distal finger portion 44 arranged to be engaged by an actuating pin 45, the latter being suitably mounted in a bore 46 formed in the guard member 22. Preferably, the member 28 has an integral flange 47 thereby to stiffen the portion of the band which includes the latch formation 43 and the finger portion 44.

The guard member 22 includes an opening or recess 48 for receiving one end of a spring 50. The other end of this spring is secured in the frame of the chain saw by engagement with various formations 51, 52 and 53. This spring member tends to urge the guard 22 toward the actuate position thereby maintaining the actuate pin 45 in engagement with the distal portion 44 of the member 28. The guard 22 also contains a wall formation 54 arranged to engage the edge of the latch arm 24 to reset the latch as will be explained hereinbelow.

Figure 5:
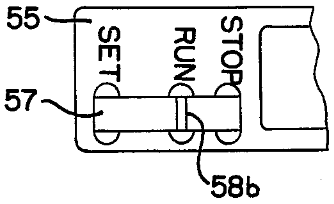
FIG. 5 is a fragmentary top view as seen along the line 5—5 of FIG. 4.

As noted in FIG. 5, the housing of the chain saw includes a wall 55 defining a cavity or space 56. The wall 55 includes a slot 57 exposing one end of an indicator bar 58, the latter having an integral rounded portion 58*a* received within a cavity formed in the guard 22. It will be understood that the indicator bar 58 is pivotally engaged with the guard 22 such that the free end 58*b* of the indicator will slide back and forth in the space 56 in response to swinging movement of the guard.

The wall 55 is provided with suitable indicia, such as "stop," "run," and "set," spaced along the slot 57. The end 58*b* of the indicator bar is suitably raised or configured such that its position along the slot 57 may be easily determined, as is evident from FIG. 5. Therefore, the bar 58 readily indicates to the operator the condition in which the brake occupies, as determined by the position of the guard 22.

When the guard member 22 is in its normal position shown in solid lines in FIGS. 1 and 2, the various parts of the safety brake will be in the positions illustrated in FIG. 4. Now, assume that the guard 22 is moved to the actuate position shown in phantom lines in FIG. 1. This movement might result if the operator's wrist or the back of his hand were to come into contact with the guard bar 22*a* due to rotation of the chain saw about the frame handle during kickback. Also, this movement of the guard might be brought about as a result of inertia in the event of sudden movement of the saw as a consequence of kickback. Since the brake of the present invention is also inertia operated, the brake is operable in all positions of the chain saw. Moreover, the operator need not maintain a specific grip on both handles to be protected from injury.

When the guard 22 is swung (clockwise as viewed in FIG. 4) to the actuate position, the actuate pin 45 depresses the finger portion 44 of the member 28 thereby separating the latch formation 43 from the latch pin 26. This in turn releases the latch bar 24 thereby permitting the column spring 38 to extend for bringing the brake band portion 33 into frictional engagement with the brake band 20 on the drum 19. Thus, movement of the cutting chain 16 will be quickly arrested. The clutch associated with the internal combustion engine prevents the latter from stalling when the safety brake is applied.

The brake is reset by manually grasping the guard bar 22*a* and swinging the same to the reset position shown in phantom lines in FIG. 2. When the guard 22 is so swung (counter-clockwise as shown in FIG. 4), the surface 54 thereof comes into engagement with the edge of the latch bar 24 thereby releasing tension in the brake band 33, thereby bowing the spring 38 to a cocked or ready position, and thereby re-establishing the latching engagement between the pin 26 and the formation 43. At the same time, the actuate pin 45 will be brought into engagement with the end portion 44 of the member 28 as illustrated in FIG. 4.

As noted in FIG. 4, the spring portion 38, when in its bowed or cocked position is in engagement with the band portion 42 thereby to hold the latch formation 43 in latching engagement with the latch pin 26. Thus, the column spring 38 serves the two-fold purpose of controlling the latching mechanism and of applying the braking force for the friction brake. Actually, it will be seen that the unitary band member 28 provides the following functions: (1) this member acts as a brake band by reason of its portion 33; (2) this member acts as a spring by reason of the column spring portion 38; and (3) this member forms part of the latching mechanism by reason of the yieldable distal end which includes the latch formation 43.

As is readily apparent from FIG. 4, the pin 23 defines a pivot axis for the guard member 22. This pivot axis is parallel to the axis of rotation of the brake drum 19 and is substantially contained in a plane containing the latter and the longitudinal center line of the cutting bar 15. This feature permits construction of the guard member in a manner permitting the latter to have a substantial moment arm without the necessity of extending the guard a substantial distance away from the saw housing or otherwise requiring the guard to be of rather cumbersome construction to effect the desired operation of the brake actuating means. It is also noted in FIG. 4 that the arm 24 is mounted by the pin 23 and thus has a common pivot axis with the guard 22. This feature provides for compact construction and also lends itself to a more simplified construction reducing the likelihood of a malfunction.

The particular configuration of the safety brake mechanism for chain saws may be varied and modified as will be apparent to those skilled in the art. The exclusive use of all variations and modifications coming within the scope of the appended claims is anticipated.

I claim:

1. In a hand-held power saw of the type including a frame with a pair of handles, a guide bar supporting a cutting chain, and power means for driving the cutting chain, the improvement comprising:

a. brake means operatively associate with said cutting chain for arresting movement of the latter;

b. brake actuating means including a guard structure mounted on the frame for movement between a normal position and an actuate position in response to engagement by the operator's body or to inertia as a consequence of sudden movement of the saw;

c. latch means independent of the brake actuating means and operatively engaged with said brake means and moveable between a latch position to prevent application of the brake means and a release position to permit application of the brake means, said latch means being engaged by the guard structure such that movement of the latter to its actuate position causes movement of the latch means to its release position; and d. a single spring element operatively engaged with said brake means and said latch means, said spring element serving to apply the braking force for said brake means and also serving to hold said latch means in its latch position, said spring element constituting the sole spring means associated with said latch means.

2. The improvement according to claim 1 further defined by:

a. said brake means including first and second friction elements engageable with each other to establish the braking action; and b. said spring element being integral with one of said friction elements.

3. The improvement according to claim 2 wherein said one friction element is in the form of a brake band and wherein said spring element is in the form of a spring band integral with the brake band.

4. The improvement according to claim 1 further defined by:

a. said brake means including a pair of friction elements, one of said friction elements being connected with the cutting chain for movement in unison therewith, the other friction element being mounted for movement into and out of frictional engagement with said one friction element;

b. said guard structure of the brake actuating means being swingably mounted between the cutting chain and one of said handles;

c. said latch means including a pivotally mounted arm connected with the other of said friction elements, said arm mounting a first latch formation, said latch means also including a second latch formation mounted for movement into and out of latching engagement with said first latch formation, said second latch formation being engaged by said guard structure such that movement of the latter to its actuate position causes movement of the former out of latching engagement with the first latch formation; and d. said spring element being engaged with said arm and said second latch formation.

5. The improvement according to claim 4 wherein said second friction element and said spring element are constituted by a single unitary member.

6. The improvement according to claim 4 wherein said other friction element, said spring element and said second latch formation are all constructed by a single unitary member.

7. The improvement according to claim 6 wherein said unitary member is in the form of a metal band member.

8. The improvement according to claim 4 further defined by:

a. said guard structure being mounted for swinging movement between said actuate position and a reset position, with the normal position of the guard structure being intermediate said actuate and reset positions; and b. said guard structure including an actuate formation engageable with said second latch formation thereby to move the latter out of engagement with said first latch formation in response to movement of the guard structure to its actuate position, said guard structure including a reset formation engageable with said arm for returning the first and second latch formations into latching engagement with each other in response to movement of the guard structure from its actuate position to its reset position.

9. The improvement according to claim 4 wherein said second latch formation is constituted by a yieldable member, and wherein said spring element is constituted by a column spring engaged with said arm and also engaged with said yieldable member.

10. The improvement according to claim 1 wherein said latch means includes a pivotally mounted arm and wherein said guard structure is pivotally mounted for movement between said normal and actuate positions, said arm and said guard structure having a common pivot axis.

11. The improvement according to claim 1 further defined by:

a. said brake means including a brake drum defining an axis of rotation;

b. said guard structure being pivotally mounted for movement between said normal and actuate positions and thereby defining a pivot axis, which pivot axis is parallel with said axis of rotation and substantially contained in a plane containing the latter and the longitudinal center line of the cutting bar.

12. The improvement according to claim 11 wherein said latch means includes an arm mounted for pivotal movement about said pivot axis.

* * * * *